3,292,243
PRODUCTION OF METAL COILS
Erich Hofling, Kreuzlingen, Switzerland, assignor to Swiss Aluminium Ltd., Chippis, Switzerland, a joint-stock company of Switzerland
No Drawing. Filed Aug. 6, 1963, Ser. No. 300,185
Claims priority, application Switzerland, Aug. 13, 1962, 9,681/62
3 Claims. (Cl. 29—155.57)

The present invention relates to a process of making metal coils and to a product produced thereby.

Induction coils comprising windings of a metal foil, one or both sides of which is coated with an electrically insulating plastic material are known, the metal preferably being aluminum. Usually, these coils are made by varnishing the metal foil on one or both sides in wide bands having a width of 300 to 1,000 mm., or by coating the metal foil with a plastic foil, cutting the resulting insulated foil into narrower bands of 5 to 200 mm. width and then coiling the coated bands. However, such processes result in the foil having exposed cut metal edges, which may be burred, and this may result in undesirable short circuits at the bases or side faces of the coil. It is, therefore, necessary to treat the side faces of the coil, so that each layer is insulated from its adjacent layer.

With metal foils intended for the manufacture of electrical condensers and coated with an insulating material, it is known to etch the metal cut edges away, including the burrs, to a certain depth so that the coating of insulation projects beyond the edge of the metal foil and sufficient insulation in the wound coil is assured. It is also known to oxidize the exposed metal edges to form an insulating layer of oxide of the metal. In either case, the foil is wound into coils and the side faces of the coils are immersed in a bath of a liquid which causes the desired chemical reaction. However, generally, as a result of capillary action, the liquid usually penetrates deeply between the layers of metal foil and contaminates the surface of the insulation, so that after the reaction with the liquid, the foil has to be cleaned to prevent the residues of liquid from attacking the insulation, and possibly also the metal foil itself, and this generally necessitates unwinding the foil, drawing it through a cleaning bath and rewinding it.

One object of the present invention is to provide a new and improved process for producing a metal coil, which is free from contacting side edges as the result of immersion of the side faces of the coil in a chemical liquid, and which is free from contamination of the layers of the coils in its interior by said chemical liquid.

The method of the present invention comprises immersing the side faces of a coil, comprising layers of metal foil separated by insulating material having exposed side edges, which may be in contact with each other, in a liquid which causes chemical reaction, so that adjacent side edges of the foil are insulated from one another, the method being characterized by the fact that the coil is wound sufficiently tightly to prevent the liquid from penetrating more than 1 mm into each side.

In conventional methods of winding metal foils, the foils are usually subjected to a tension of about 25% of their tensile strength, but the resulting coil is not sufficiently tight to prevent the chemical liquid from penetrating the side faces of the coil to an undesirable extent. In accordance with the preferred method of the present method of the present invention, however, the metal foil is coiled under a tension which is always more than 30% of the tensile strength of the foil, thereby producing a coil comprising layers of metal foil separated by insulating material but having exposed side edges, which may be in contact with one another; the side faces of the coil are then immersed in the liquid which causes chemical reaction, so that adjacent side edges are insulated from one another.

When coiling is carried out under a constant tension, the surface pressure decreases progressively outwardly from one layer of the coil to the next, and the tightness of the coil increases inwardly. In order that the depth of penetration of the bath solution be substantially uniformly small throughout, the surface pressure between the individual layers of the coil must be as constant as possible. Coiling is, therefore, effected preferably with a decreasing tension, the mean tension, however, being more than 50% of the foil tensile strength.

In order to decrease further the depth of penetration of the liquid in the tightly wound coil, the foil may be coated with a water repellant medium on at least one side before winding, and this coating may remain on the foil, provided that it does not attack the insulating coating or the metal. Silicone oil or a mineral oil, for example, may be used.

It is only necessary to immerse each side face of the coil in the liquid, but instead of accomplishing this in two separate stages, for convenience, it is desirably carried out in one stage by immersing the whole coil in the liquid. If the outer surface of the coil is of exposed metal, then of course, this surface must be covered with a protective layer, if it is not intended that this surface react also in the liquid.

The preferred way of insulating the adjacent side edges of the coil convolutions from each other, is to etch away the exposed metal at the sides. The insulating material will not etch and so will subsequently project beyond the foil. It has been found that sufficient insulation is obtained by having a projection of only, for example, 0.005 to 0.3 mm. on each side. In the case of aluminum, acid solutions are employed. If the liquid is 30% hydrochloric acid, then immersion for from 1 to 5 minutes at room temperatures will eliminate any burrs on the cut side edges and will etch away the metal to a depth of less than 1 mm.

Instead of etching away the metal, the metal may be subjected to some chemical reaction to produce an insulating layer in situ on the metal. For example, it may be oxidized, chromatized or phosphatized. A convenient way of oxidizing the metal foil is to carry out an anodic oxidation by immersing the side face of the coil, at least, as an anode, in 15 to 25% sulfuric acid for up to 45 minutes. Using a current density of 1–5 amps/dm.$^2$, an insulating oxide coating having a thickness of 0.005 to 0.2 mm. is produced on the exposed metal side edge.

Due to the small depth of penetration of the liquid effected in following the method of the present invention, it is not necessary to unwind the coil and then subject the foil to cleaning after treatment with the liquid. Instead, it is merely necessary to clean the side faces of the coil, and this can be done quite well while the foil is still tightly coiled. The mode of cleaning will depend on the liquid which was used for the chemical reaction at the exposed side edges of the metal. If the liquid was an acid, then for example, the coil may be immersed in a rinsing bath and subjected to ammonia vapors to neutralize any acid remaining and then finally dried in vacuo.

The coils treated according to the invention are ordinarily directly used as induction coils but are delivered in that form as semi-products to the manufacturer, who can store them as long as necessary without the risk of being damaged by time. The manufacturer cuts the foil ribbon to the desired length according to the size of the electrical coil to be fabricated, fixes the terminal leads, and winds up the ribbon mainly on a quadratic core or sleeve to an electrical coil, which may finally be coated in the usual way.

What is claimed is:

1. A method of producing metal coils, which comprises winding metal foil with a layer of insulating material thereon under a decreasing tension, the mean tension being more than 50% of the tensile strength of the foil, to produce thereby a coil comprising layers of metal foil separated by insulating material but having exposed side edges, which may be in contact with one another, and immersing the side faces of the coil in a chemical reacting liquid having the effect of causing adjacent side edges of the foil to become insulated from one another.

2. A method according to claim 1, in which the chemical reacting liquid is an etching liquid which acts to etch away the exposed side edges of the metal foil.

3. A method according to claim 1, in which the chemical reacting liquid is an anodizing liquid resulting in the anodic oxidizing of the exposed side edges of the metal foil.

References Cited by the Examiner

UNITED STATES PATENTS

| | | | |
|---|---|---|---|
| 2,927,366 | 3/1960 | Link | 29—155.57 |
| 3,112,556 | 12/1963 | Zack | 29—155.57 |
| 3,113,374 | 12/1963 | Zack | 29—155.57 |

CHARLIE T. MOON, *Primary Examiner.*

JOHN F. CAMPBELL, W. I. BROOKS,
*Assistant Examiners.*